(12) United States Patent
Goswami et al.

(10) Patent No.: US 10,684,027 B2
(45) Date of Patent: Jun. 16, 2020

(54) SYSTEM AND METHOD FOR PHOTOELECTROCHEMICAL AIR PURIFICATION

(71) Applicant: Molekule Inc., San Francisco, CA (US)

(72) Inventors: Dilip Goswami, San Francisco, CA (US); David Sanabria, San Francisco, CA (US)

(73) Assignee: Molekule, Inc., San Francisco, CA (US)

( * ) Notice: Subject to any disclaimer, the term of this patent is extended or adjusted under 35 U.S.C. 154(b) by 0 days.

(21) Appl. No.: 16/169,874

(22) Filed: Oct. 24, 2018

(65) Prior Publication Data

US 2019/0120508 A1    Apr. 25, 2019

Related U.S. Application Data

(60) Provisional application No. 62/576,500, filed on Oct. 24, 2017.

(51) Int. Cl.
| | | |
|---|---|---|
| *A61L 9/20* | (2006.01) | |
| *F24F 3/16* | (2006.01) | |
| *F24F 140/10* | (2018.01) | |
| *F24F 110/20* | (2018.01) | |
| *F24F 110/65* | (2018.01) | |

(52) U.S. Cl.
CPC ........... *F24F 3/1603* (2013.01); *F24F 3/166* (2013.01); *F24F 2003/1628* (2013.01); *F24F 2003/1667* (2013.01); *F24F 2110/20* (2018.01); *F24F 2110/65* (2018.01); *F24F 2140/10* (2018.01); *F24F 2221/12* (2013.01); *F24F 2221/38* (2013.01)

(58) Field of Classification Search
CPC ........................................ A61L 9/205
See application file for complete search history.

(56) References Cited

U.S. PATENT DOCUMENTS

| | | | | |
|---|---|---|---|---|
| 5,453,049 | A | * | 9/1995 | Tillman, Jr. ........... B01D 46/10 454/228 |
| 5,790,934 | A | * | 8/1998 | Say ..................... B01D 53/885 204/157.15 |
| 5,873,920 | A | * | 2/1999 | Wong ................. B01D 46/2411 55/385.3 |
| 7,063,820 | B2 | | 6/2006 | Goswami |
| 7,371,351 | B2 | | 5/2008 | Goswami |
| 10,137,216 | B2 | | 11/2018 | Goswami et al. |
| 10,183,187 | B2 | | 1/2019 | Li |

(Continued)

OTHER PUBLICATIONS

Molekule website screen grabs from Wayback Machine Internet Archive. Jun. 10, 2016 (Year: 2016).*

*Primary Examiner* — Donald R Spamer
(74) *Attorney, Agent, or Firm* — Jeffrey Schox; Diana Lin

(57) ABSTRACT

An air purification system including a housing defining a lumen, an inlet, an outlet, and a flow pathway between the inlet and the outlet and through the lumen; a filter assembly retained within the lumen and including a substrate defining an open three-dimensional volume, a photocatalytic material disposed on the substrate, and a photon source arranged to illuminate the photocatalytic material with optical radiation; and a flow control mechanism arranged along the flow pathway between the inlet and the outlet.

19 Claims, 9 Drawing Sheets

(56) References Cited

U.S. PATENT DOCUMENTS

| | | | |
|---|---|---|---|
| 2006/0124442 A1* | 6/2006 | Valpey, III | A61L 9/205 204/157.15 |
| 2010/0143205 A1* | 6/2010 | Engelhard | A61L 9/205 422/121 |
| 2011/0088375 A1* | 4/2011 | Suzuki | B01D 53/90 60/295 |
| 2011/0203238 A1* | 8/2011 | Witter | B01D 46/0093 55/356 |
| 2012/0183443 A1* | 7/2012 | Hurley | A61L 9/205 422/121 |
| 2012/0273340 A1* | 11/2012 | Felix | B01D 53/007 204/157.3 |
| 2015/0158741 A1* | 6/2015 | Lee | C02F 1/003 210/184 |
| 2017/0106218 A1* | 4/2017 | Lin | B03C 3/155 |

* cited by examiner

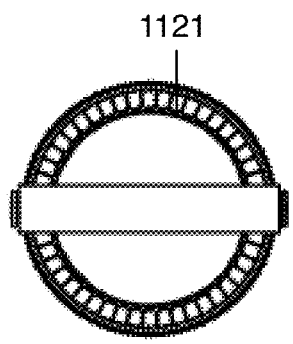
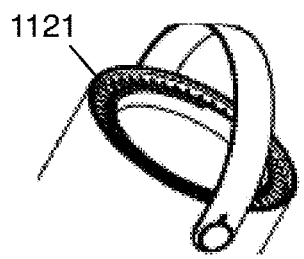
FIGURE 5A FIGURE 5B
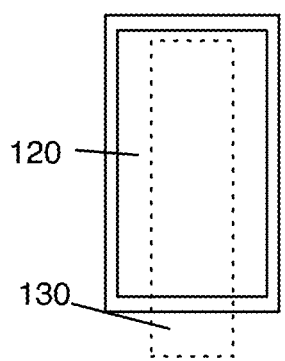
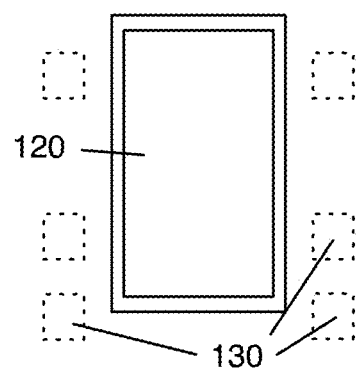
FIGURE 6A FIGURE 6B
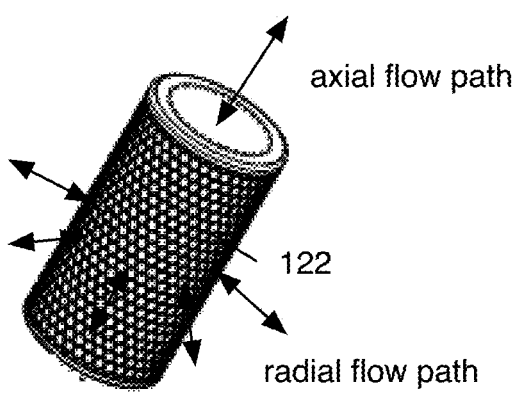
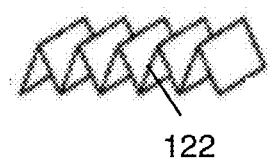
FIGURE 7A FIGURE 7B

SYSTEM AND METHOD FOR PHOTOELECTROCHEMICAL AIR PURIFICATION

CROSS-REFERENCE TO RELATED APPLICATIONS

This application claims the benefit of U.S. Provisional Application No. 62/576,500, filed 24 Oct. 2017, which is incorporated in its entirety herein by this reference.

TECHNICAL FIELD

This invention relates generally to the air purification field, and more specifically to a new and useful system and method for photoelectrochemical air purification in the air purification field.

BACKGROUND

Various filtration systems can be used to reduce the concentration of pollutants in the air. Trapping filters can have low costs, but simply retain pollutants on a filter medium and can thus be fouled by high pollutant concentrations and/or as a result of extended runtimes. In addition, trapping filters can provide a growth medium for biological contaminants, and thus can have a negative effect on air quality. UV disinfection can be employed for biological contaminant elimination but can cause the formation of additional pollutions (e.g., ozone) and is generally ineffective in degrading many other toxic chemicals such as formaldehyde, styrene, toluene, and other chemicals which are often found in various environments to which humans can be exposed.

Thus, there is a need in the air purification field for a new and useful system for photoelectrochemical air purification. This invention provides such a new and useful system and method.

BRIEF DESCRIPTION OF THE FIGURES

FIGS. 5A and 5B depict a top down and perspective view, respectively, of a variation of an outlet of an example embodiment of the air purification system;

FIGS. 6A and 6B depict example arrangements of the photon source of an example embodiment of the air purification system;

FIGS. 7A and 7B depict illustrations of variations of the filter assembly of example embodiments of the air purification system.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview

Figure 1:
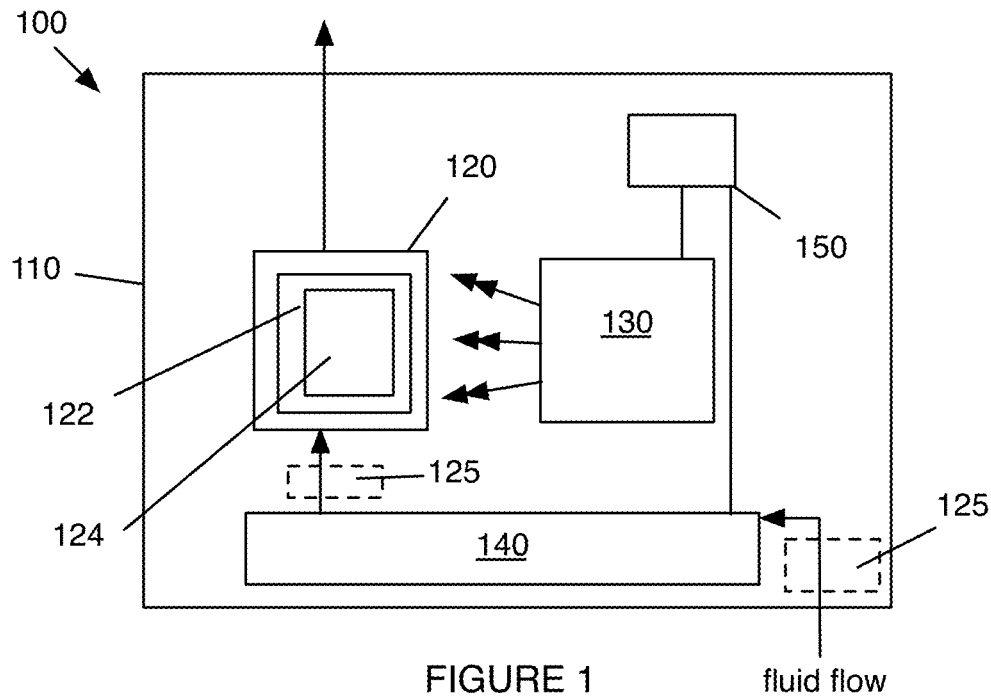
FIG. 1 depicts a schematic illustration of an example embodiment of the air purification system.

As shown in FIG. 1, an embodiment of the system 100 for air purification can include a housing no, a filter assembly 120 retained by the housing 110 that includes a substrate 122 and a photocatalytic material 124 disposed on the substrate 122, a photon source 130 retained by the housing 110 and arranged to illuminate the photocatalytic material 124, and a flow control mechanism 140 arranged within the housing 110 that is operable to pass fluid through the housing 110 and proximal to the filter assembly 120. The system 100 can additionally or alternatively include a controller 150 communicatively coupled to the photon source 130 and the flow control mechanism 140, a prefilter 125, one or more sensors 152, as well as any other suitable mechanisms and/or components for facilitating air purification.

The system 100 functions to eliminate fluid-borne pollutants from a fluid stream (e.g., air stream, air flow, liquid stream, etc.). Pollutants can include volatile organic compounds (VOCs), biological contaminants (e.g., bacteria, viruses, mold spores, waste products, etc.), soot particles, and any other pollutants that can be found in indoor and/or outdoor flows. In variations, the system 100 can also function to integrate into existing airflow systems (e.g., HVAC ducting, vehicle ventilation systems, etc.). In variations, the system 100 can also function to provide stand-alone purification capacity for indoor and/or enclosed spaces (e.g., as a free-standing air purifier for a residential or commercial indoor space, a modular air purifier for a vehicle, etc.). The system 100 can also function to provide a high surface area photocatalytic surface (e.g., to increase pollutant reduction efficiency) such as a coated fibrous substrate, a coated porous substrate, and the like. The system 100 can also function to provide a photocatalytic surface that encourages increased localization time periods of pollutants proximal to the surface (e.g., enhances chemical affinity for VOCs and/or other pollutants). However, the system can additionally or alternatively have any other suitable function.

In variations, the system 100 can receive power from an external source. In a first variation of the system, the system can be connected to a source of electrical power (e.g., the power grid) by way of a direct electrical connection (e.g., a power cable). In a second variation of the system, the system can convert input power of any suitable form (e.g., wind power, solar power, ambient thermal energy, etc.) into electrical power (e.g., from an air-driven generator in-line with an integrated ventilation system having a directed airflow, from a photovoltaic energy converter, etc.), and/or can be connected to a source of electrical power (e.g., the power grid, building power, a portable generator, etc.) by way of a direct electrical connection. In further variations, the system can omit an electrical power source (e.g., the system can operate substantially passively, the system can utilize direct mechanical power conversion without an intermediate electrical power converter, etc.). However, the system can be otherwise suitably powered.

Figure 2:
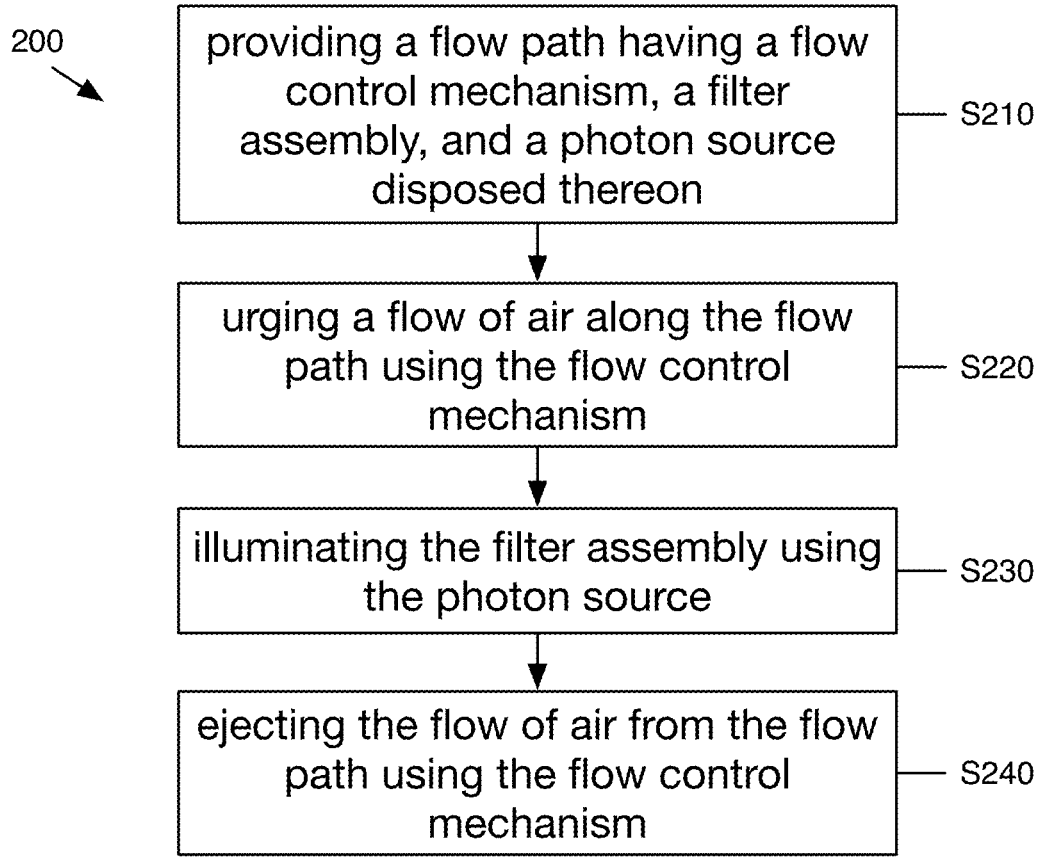
FIG. 2 depicts a flowchart of an example implementation of the method for air purification.

As shown in FIG. 2, a method 200 for air purification can include: providing a flow path having a flow control mechanism, a filter assembly, and a photon source disposed thereon S210; urging a flow of air along the flow path using the flow control mechanism S220; illuminating the filter assembly using the photon source S230; and ejecting the flow of air from the flow path using the flow control mechanism S240. The method for air purification can optionally include: modulating the flow of air S225; modulating the illumination S235; and/or any other suitable method process or Blocks.

The method 200 functions to eliminate airborne pollutants from a fluid stream. The method 200 can also function to utilize a system analogous to the system 100 described herein. However, the method 200 can additionally or alternatively have any other suitable function.

2. Benefits

Variants of the technology can confer several benefits and/or advantages.

First, variants of the technology can enable air disinfection and purification by destroying (e.g., chemically oxidizing, eliminating) pollutants (e.g., instead of trapping pollutants fully-constituted and retaining pollutants in chemically identical form). Such variants can perform pollutant destruction (e.g., without the use of direct photoionization) through photocatalytic oxidation (PCO), photoelectrochemical oxidation (PECO), and other suitable processes.

Second, variants of the technology can enable indoor air purification in a modular, movable form factor. Such variants enable the system to be employed in various indoor environments (e.g., a room in a residential building, a vehicle cabin, an airplane cabin, a hospital room, etc.). Such variants can also enable the scaling of an air purification system incorporating multiple discrete systems to purify the air of large indoor spaces (e.g., warehouses) as well as small indoor spaces (e.g., closets), by using various numbers of discrete systems selected based on the needed air processing capacity.

Third, variants of the technology can enhance the performance of PCO and/or PECO systems through the use of controlled patterns of airflow adjacent to a filter assembly. The airflow can be configured through passive and/or active means to increase residence time of pollutants in proximity to the filtration system (e.g., the illuminated filter assembly), thereby increasing filtration efficiency by increasing the likelihood of pollution oxidation while a pollutant is within the device (e.g., proximal the filter assembly). The airflow of the air can also be passively and/or actively controlled by variants of the system, such that mixing within the enclosed space wherein the system is emplaced (e.g., an indoor room, a vehicle cabin, a hospital room, an office, etc.) is hydrodynamically generated (e.g., by injecting angular momentum into the output airflow via a set of static or dynamic guide vanes).

Fourth, variants of the technology can enhance the performance (e.g., power efficiency, pollutant elimination efficiency, etc.) of PCO and/or PECO systems via arrangement and/or active control of photon source(s) that illuminate the photocatalytic material. In some example embodiments, the photon sources can be advantageously arranged to generate a predetermined threshold illumination over a maximal area of the filter assembly using a minimal number of discrete emitters (e.g., light emitters, LEDs) of the photon source, and thereby minimizing the total power required for optimal illumination. In further example embodiments, the photon sources can be modulated between an on and off state at a frequency selected to correspond to the state lifetimes (e.g., at a base frequency, at a harmonic frequency equivalent to a multiple of an average hole-formation and -recombination frequency, etc.) of the electron-hole pairs generated via illumination of the photocatalytic material (e.g., and/or extended by enhanced electron mobility in the vicinity of the photocatalytic material, such as by a conductive support structure), such that the duty cycle of the photon sources is reduced relative to continuous illumination while achieving similar (e.g., substantially equivalent) pollutant reduction performance. In still further example embodiments, the photon sources can be modulated temporally and/or spatially (e.g., to correspond to airflow time and length scales, spatial patterns of photocatalytic material, etc.), such that photocatalytic material is activated in regions of the filter assembly corresponding to desired flow variables (e.g., high pressure zones, high pollutant concentration zones, stagnant regions, etc.) and/or structural, geometric factors (e.g., high relative concentrations of photocatalytic material disposed on the substrate).

Fifth, variants of the technology can enhance the power efficiency of air purification systems via geometry and/or control of the flow control mechanism. For example, the size of an impeller of the flow control mechanism can be selected to match the geometry of the flow path. In another variation, a point on the static-dynamic pressure (PQ) curve associated with the active flow control mechanism can be selected to maximize the desirable airflow parameters (e.g., flow velocity, flow pressure, etc.) at a minimum power input to the flow control mechanism (e.g., electrical input power to an impeller). However, variants of the system can otherwise suitably control the flow control mechanism to enhance power efficiency.

Sixth, variants of the technology can enable single-pass air purification; for example, variants of the system and/or method can include destruction of pollutants above a threshold percentage reduction (e.g., 80%, 90%, 99.99%, etc.) after a single pass of air flow through the air purification system.

Seventh, variants of the technology can enable pollutant destruction without using ionizing radiation (e.g., UV-C and higher photon energies), instead using non-ionizing radiation (e.g., near-UV, UV-A, UV-B, visible radiation, etc.). This can reduce and/or eliminate adverse health effects resulting from possible exposure to UV light in an undesirable range (e.g., the UV-C range, near 280 nm, etc.) and/or from the biproducts of ionizing radiation (e.g., undue ozone production) entering the airflow.

However, variants of the technology can confer any other suitable benefits and/or advantages.

3.1 Housing

The system 100 preferably includes a housing 110. The housing 110 functions to retain the components of the system. The housing 110 can also function to define air flow path(s) through the system (e.g., between one or more inlets and one or more outlets). The housing 110 can, in variations, define a lumen 114, one or more inlets in, and one or more outlets 112. The housing 110 can also include a pedestal. The housing 110 can be a single unitary body but can additionally or alternatively include a plurality of interlocking housing sections defining a body, a free-standing support, and/or any other suitable housing sections or components.

The housing 110 and/or components thereof preferably define a substantially complete enclosure but can additionally or alternatively define an open structure (e.g., a rim), a modular enclosure (e.g., an expandable and interconnectable network of self-contained air purification modules), and/or any other suitable structure at which system components are retained.

The housing 110 is preferably fabricated at least in part from one or more plastic materials (e.g., thermoplastic, polycarbonate, nylon, high- and/or low-density polyethylene, polystyrene, polyurethanes, polyvinyl chloride, acrylonitrile butadiene styrene, etc.), but can additionally or alternatively be fabricated from aluminum (e.g., brushed aluminum, anodized aluminum, etc.), other metallic and/or electrically- and/or thermally-insulating materials, and/or any other suitable material or combination(s) thereof.

The housing no preferably defines a lumen 114. The lumen 114 functions to form a space within the housing no through which fluid (e.g., air) flows between an inlet in and an outlet 112 (e.g., along a flow path). The lumen 114 also functions to define a void (e.g., a contiguous void, a plurality of discontinuous voids, etc.) in which system components (e.g., the flow control mechanism 140, the photon source 130, the filter assembly 120, etc.) can be retained. The lumen 114 can also function to define one or more flow pathways between the inlet 111(s) and the outlet 112(s). The lumen 114 can also function to position the filter assembly 120 intersecting one or more flow pathways (e.g., such that air flow through the housing 110 passes air adjacent to the filter assembly 120 for pollutant reduction). The lumen 114 can define any suitable retention points (e.g., posts, clips, brackets, etc.) at which system components (e.g., the filter assembly 120, the flow control mechanism 140) are retained. However, the lumen 114 can be otherwise suitably defined by the housing no.

Figure 3:
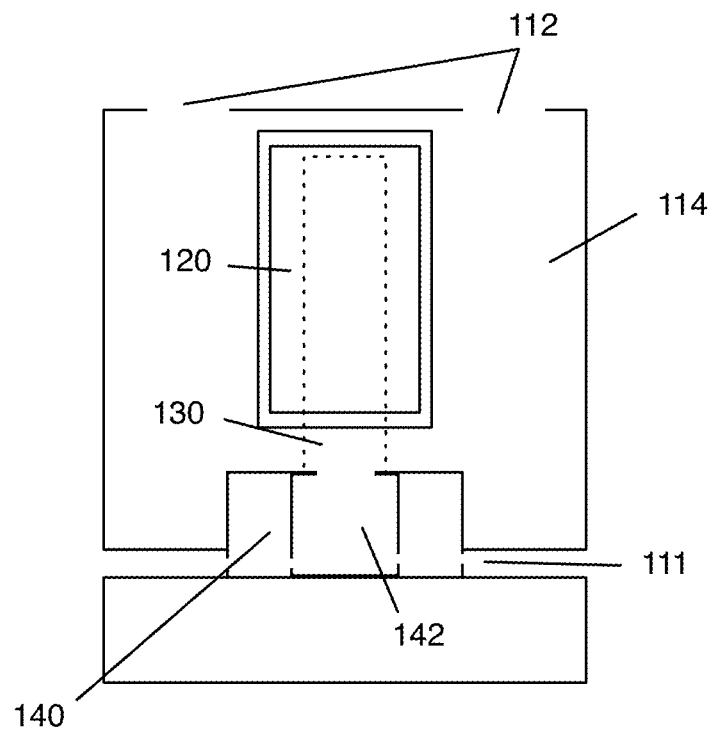
FIG. 3 depicts a cutaway view of an example embodiment of the air purification system.

In a specific example, as shown in FIG. 3, the lumen 114 defines a substantially cylindrical volume between an inlet in, arranged at the base of the cylindrical volume, and an outlet 112, arranged at the top of the cylindrical volume. In this specific example, the filter assembly 120 and photon source 130 are arranged concentrically within the cylindrical volume, oriented substantially along the longitudinal centerline (e.g., longitudinal axis) of the cylindrical volume. In this specific example, the flow control mechanism 140 is arranged proximal the base of the cylindrical volume between the inlet in and the filter assembly 120, and includes an impeller (e.g., impeller module) that spans the flow path between the inlet in and the filter assembly 120. However, the inlet in, outlet 112, flow paths, and/or flow control mechanism 140 can be otherwise located, shaped, and/or defined.

Figure 4A:
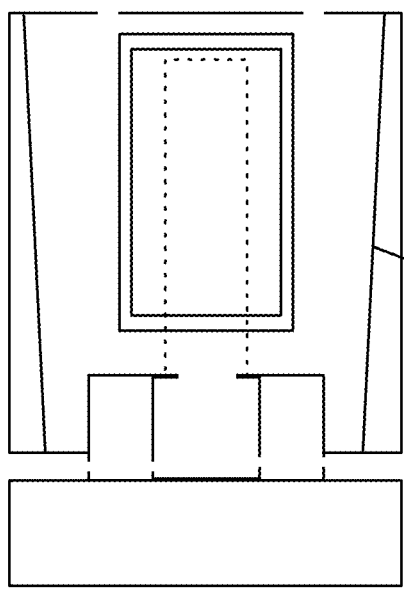
FIGS. 4A and 4B depict cross sectional views of a portion of example embodiments of the air purification system.
Figure 4B:
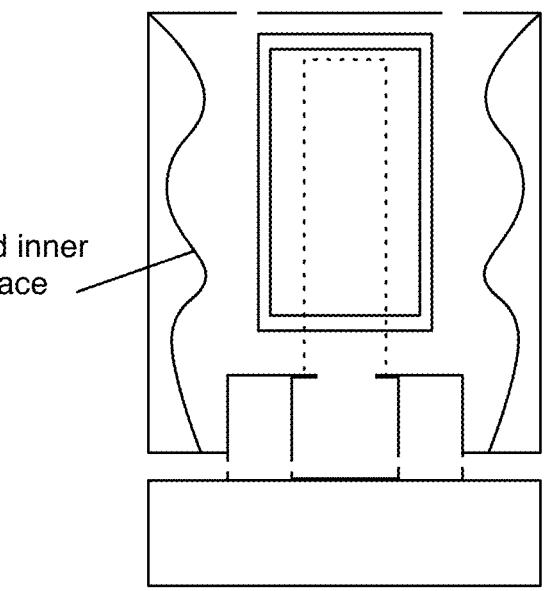

In variations, the lumen 114 defines a shaped inner surface that passively directs air flow within the lumen 114 (e.g., proximal the filter assembly 120). The shaped inner surface can include guide vanes, helical undulations, turbulators (e.g., morphological features that extend into the lumen 114 normal to the flow path to turbulate the boundary layer between the air flow and the inner surface, bluff features arranged to destabilize the air flow and induce turbulent mixing of the air flow between the inlet in and the outlet 112, etc.), baffles, features (e.g., posts, spikes, slats) extending radially toward the longitudinal axis of the lumen 114 and/or chord-wise across the lumen 114 substantially perpendicular to the bulk flow direction between the inlet in and the outlet 112, and any other suitable morphological features and/or characteristics for fluid-dynamically interacting with air flow through the lumen 114. The shaped surface is preferably tapered (e.g., decreasing in average diameter between the base and top of the lumen 114, increasing in average diameter between the base and the top of the lumen 114 as shown in FIG. 4A, alternating between greater and smaller diameters periodically along the extent of the lumen 114 as shown in FIG. 4B, etc.), but can additionally or alternatively be straight (e.g., having substantially the same average diameter along the vertical extent of the lumen 114). The inner surface and/or features thereof are preferably static, but can alternatively be actuatable (e.g., actively controlled by a motor, manually controlled, etc.). In the latter variant, the features can be automatically controlled based on on-board sensor signals (e.g., particulate density, etc.), remote control instructions, user instructions, or any other suitable set of data or instructions. However, the surface of the lumen 114 can additionally or alternatively have any other suitable shape and/or define any other suitable features.

The inner surface of the lumen 114 can optionally define a converging-diverging geometry. For example, the inlet 111 to the lumen 114 can define a first diameter that is greater than an intermediate diameter, at which point the flow control mechanism 140 is positioned and spans substantially the entirety of the flow path, and that is substantially the same diameter as a section downstream of the intermediate diameter. An example of such a converging-diverging geometry is shown in FIG. 4. However, the inner surface can alternatively omit a converging-diverging geometry.

In a specific example, the inner surface of the lumen 114 monotonically increases in average diameter along a direction extending between the inlet in and the outlet 112. This increasing diameter can increase the static pressure recovery of the air flow as it exits the impeller module proximal the inlet and flows through the lumen 114 towards the outlet 112 and induce turbulent transition of the air flow along the surface and enhance turbulence-driven mixing of the airflow as it transits the lumen 114 proximal the filter assembly 120.

The inlet in of the housing 110 functions to provide an intake of air (e.g., pollutant-laden air) for provision to the lumen 114 (e.g., containing the filter assembly 120) for decontamination. In a first variation, the inlet 111 is defined as an annular orifice at the base of the housing no through which air is drawn into the lumen 114. In a second variation the inlet in includes a broad rectilinear opening configured to mate to an existing ventilation system. In a third variation, the housing no includes a plurality of orifices distributed about the housing 110 that together define the inlet in, wherein the plurality of orifices is arranged to maximize volumetric throughput through the lumen 114 adjacent to the filter assembly 120. However, the inlet 111 can additionally or alternatively define any suitable shape and can include a plurality of inlets in distributed in any suitable manner.

The outlet 112 of the housing no functions to output purified, disinfected, and/or otherwise pollutant-depleted air from the lumen 114 into the ambient environment surrounding the system. The outlet 112 can also function to direct fluid flow out of the system into the environment in a controlled manner (e.g., to encourage mixing in an enclosed space, to enhance transport of purified air to predetermined or actively determined locations, etc.). In a first variation, the outlet 112 is arranged at the top surface of the housing 110. In a second variation, the outlet 112 includes a broad rectilinear opening configured to mate to a ventilation system (e.g., an HVAC duct of standard dimensions) positioned such that a projected area of the outlet 112 overlaps (e.g., identically overlaps, substantially overlaps, etc.) the projected area of the inlet in (e.g., the volume defined between the inlet in and the outlet 112 areas is a right rectangular prism, a pyramidal volumetric section, etc.). In related variations, the outlet 112 can define a broad opening of a non-rectilinear shape (e.g., a circle, an oval, etc.) and/or can define a projected area that does not overlap the projected area of the inlet in (e.g., the volumetric section defined between the inlet in and the outlet 112 can include a bend, such as a 90° bend, a 180° bend, etc.).

Figure 9:
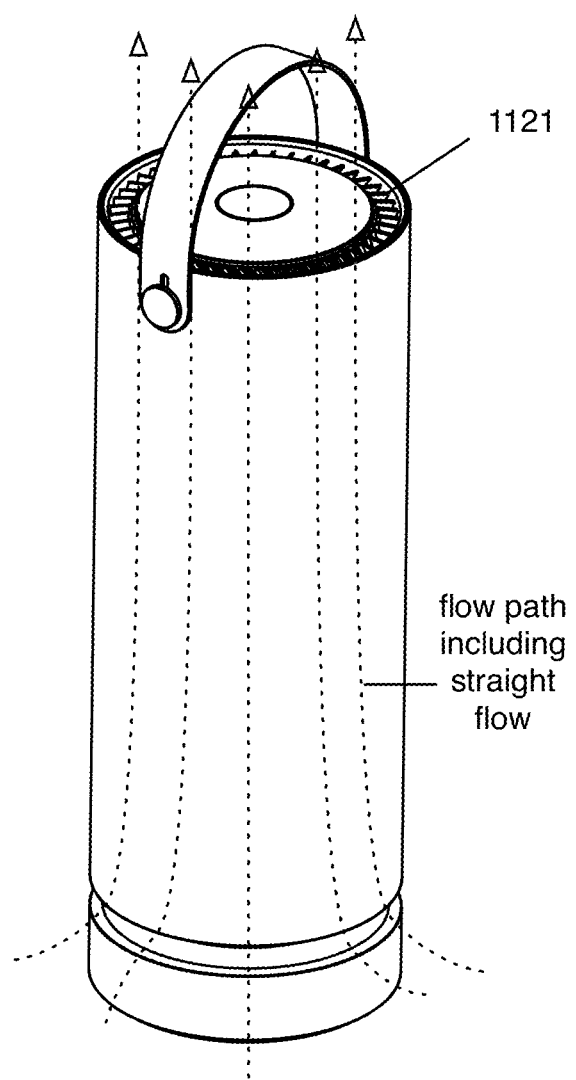
FIGS. 9 and 10 depict examples of airflow pattern variants through the system.

In variations, the outlet 112 can define an annular opening at the top surface of the housing 110, wherein the annular opening includes a plurality of angled guide vanes 1121 positioned within the air flow through the outlet 112. As shown in FIGS. 5A-5B and 9, the angled guide vanes 1121 are preferably arranged within the annular opening at the outlet 112 of the cylindrical volume, spanning the radial direction of the annular area defined by the outlet 112 and arranged at an oblique angle to the axial direction of the flow through the cylindrical volume. The oblique angle at which each of the angled guide vanes 1121 is arranged is preferably the same (e.g., an identical oblique angle), but in alternative variants each guide vane can be arranged at a different angle, the angle of each guide vane can vary according to a function of azimuthal position (e.g., linearly, nonlinearly, etc.) or any other suitable function, the guide vane angle(s) can be adjustable, or be otherwise suitably arranged. In one example, the angled guide vanes 1121 extend radially outward from a central longitudinal axis and are separated by an inter-vane distance that is equal to or less than a predetermined proportion (e.g., half, a quarter, etc.) of the chord length, vane thickness, or other vane dimension. The angled guide vanes 1121 are preferably at an oblique angle to the flow direction (e.g., along the axis defined perpendicular to the annular area of the outlet 112) but can alternatively be at any suitable angle (e.g., parallel to the flow direction to act purely as flow obstructions to induce turbulence and/or mixing). Each of the angled guide vanes 1121 is preferably arranged at the same angle relative to the flow direction but the angled guide vanes 1121 can additionally or alternatively be arranged at different relative angles. The angled guide vanes 1121 are preferably static (e.g., rigidly attached to the sidewalls of the outlet 112), but can additionally or alternatively be movable (e.g., actively controllable as control surfaces, manually adjustable, removable, etc.). In a specific example, the angled guide vanes are adjustable (e.g., manually adjustable, automatically adjustable based on control instructions received from the controller, etc.) by way of a linkage (e.g., swash plate, static linkage analogous to cyclic control, etc.) that enables each vane to be rotated simultaneously. However, the angled guide vanes 1121 can be otherwise suitably configured.

In a specific example, the outlet 112 includes a set of outlet vanes 1121, and each of the set of outlet vanes 1121 is arranged at an oblique angle to the flow path. In this specific example, the oblique angle at which each of the set of outlet vanes 1121 is arranged is identical; however, in related examples, the oblique angle at which each of the set of outlet vanes 1121 is arranged can differ in any suitable manner.

The housing 110 preferably includes a single outlet 112 but can additionally or alternatively include a plurality of outlets 112 and/or define a plurality of orifices that make up the outlet 112.

3.2 Filter Assembly

The filter assembly 120 functions to provide a photocatalytic surface that, when illuminated by the photon source 130, reduces pollutants in a fluid stream in contact therewith. The filter assembly 120 also functions to retain the photocatalytic elements of the system in one or more flow paths of fluid through the housing 110. The filter assembly 120 also functions to retain the photocatalytic elements of the system relative to the photon source 130(s) at an appropriate position for illumination of the photocatalytic material 124 by the photon source 130(s). The filter assembly 120 includes a substrate 122 and a photocatalytic material 124 disposed on the substrate 122. The filter assembly 120 can also include a support structure that mechanically supports the coupled substrate 122 and photocatalytic material 124 and defines the shape of the filter assembly 120. The filter assembly can also include a prefilter 125.

The filter assembly 120 is preferably retained within the lumen 114 of the housing 110. In a first variation, the filter assembly 120 is arranged concentrically within the lumen 114 (e.g., a cylindrical lumen). The filter assembly 120 is preferably in fluid communication with the ambient environment, by way of the inlet 111 and outlet 112 defined by the housing 110. However, the filter assembly 120 can be otherwise suitably fluidly connected.

The filter assembly 120 is preferably arranged proximal the photon source 130, such that the photon source 130 can illuminate the surface area (e.g., the entire surface area, a maximized portion of the surface area, a patterned or otherwise suitably predetermined portion of the surface area, a single side, all sides, another suitable portion of the surface area, etc.) of the filter assembly 120. In a first variation, the filter assembly 120 is arranged surrounding the photon source 130 (e.g., in a cylindrical prism circumscribing the photon source 130, concentrically within the lumen 114, etc.) as shown in FIG. 6A. In a second variation, the filter assembly 120 is arranged within the photon source 130 (e.g., surrounded by the photon source 130, in a cylindrical prism circumscribed by the photon source 130, in the focal region of a series of reflective elements arranged to redirect the output of the photon source 130, etc.). In a third variation, the filter assembly 120 is arranged at an oblique angle from the photon source 130, wherein the photon source 130 is a distributed source (e.g., including a plurality of light emitters 132) arranged proximal the filter assembly 120 as shown in FIG. 6B.

However, the filter assembly 120 can be otherwise suitably arranged within the housing 110 and relative to any other suitable system components.

In a specific example, the filter assembly 120 is shaped as a cylindrical tube (e.g., by a metallic mesh support structure) and is retained concentrically within the lumen 114 by an attachment point. The attachment point is preferably located at an inner surface of the lumen 114 proximal the central region of an annular outlet 112 but can be otherwise suitably located.

The substrate 122 of the filter assembly 120 functions to provide a material to which photocatalytic material 124 can be attached, and with which fluid can be brought into contact for purification. The substrate 122 is preferably directly connected and permanently attached to the filter assembly 120 (e.g., in cases wherein the filter assembly 120 is disposable and/or replaceable) but can additionally or alternatively be removably coupled to the filter assembly 120 (e.g., in cases wherein the substrate 122 is disposable and/or replaceable but the support structure of the filter assembly 120 is reusable).

In a first variation, the substrate 122 can be shaped as a cylindrical tube, as shown by example in FIG. 7A, wherein a longitudinal axis of the cylindrical tube is substantially aligned with (e.g., parallel to, within a small angle of parallel to, coextensive with, etc.) the longitudinal axis of the lumen 114. However, the substrate 122 can additionally or alternatively be shaped as any suitable open or closed three-dimensional volume. The flow path can be arranged in a first configuration wherein the flow enters the cylindrically-oriented substrate 122 radially before discharging along a longitudinal axis. Similarly, flow path can pass through the substrate 122 along the longitudinal axis and exit radially from the substrate 122. In another variation, flow can be directed to flow across the substrate 122 radially both inwardly and outwardly, and flow both inwardly and outwardly along directions parallel to the longitudinal axis of the cylinder. In another variation, the flow is uniform throughout the whole region proximal the surface of the catalytic filter and flows at substantially the same rate through the top portion of the filter assembly 120 as other portions of the filter assembly 120 (e.g., by equalizing the pressure drop between any two points below and above the filter assembly, respectively). In another variation, the flow path is helical between the inlet and the outlet (e.g., induced by a passive flow guide downstream of the impeller module) and passes through, over, and/or along the substrate as the airflow transits the lumen. However, the system can be otherwise suitably configured to flow fluid proximal and/or through the substrate 122 in any other suitable manner.

In a second variation, the substrate 122 can be configured as a substantially flat surface with a quadrilateral projected area normal to the direction of airflow to the substrate 122. The substrate 122 can, in variations, have a macro-geometry and a microgeometry. The macro-geometry can define the overall shape of the substrate 122, whereas the microgeometry can define the surface morphology and/or shape of the substrate 122 at a smaller spatial scale than the macro-geometry. For example, the substrate 122 can have a macro-geometry corresponding to a cylinder and a micro-geometry (e.g., surface morphology) shaped as a corrugated surface, a rough surface, a smooth surface, and/or any other suitable micro-geometry (e.g., geometry on a smaller scale than the macro-geometry).

Figure 14:
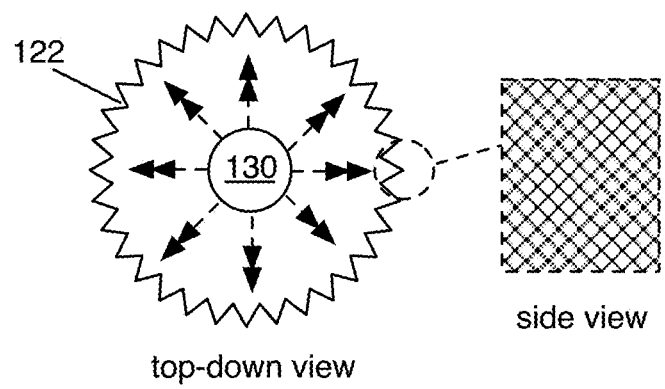
FIG. 14 depicts a variation of a portion air purification system including a pleated substrate.
Figure 16:
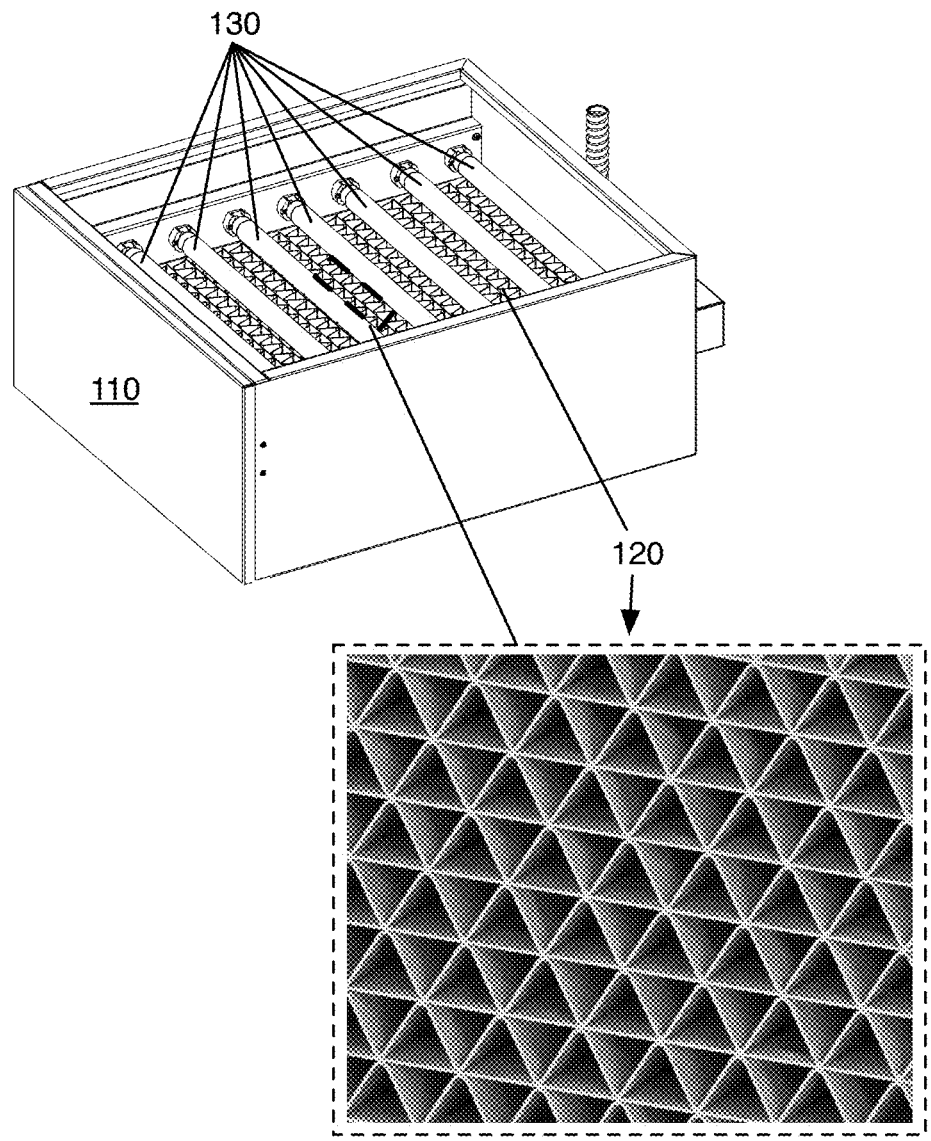
FIG. 16 depicts an example embodiment of the air purification system.

In a first specific example, as shown in FIG. 14, the substrate 122 is formed in a substantially cylindrical shape having a corrugated outer surface, wherein the corrugation is along an azimuthal axis of the cylinder (e.g., undulating in the azimuthal direction). In a second specific example, the substrate 122 is formed in a substantially rectangular shape and defines a substantially smooth broad surface; in related examples, the broad surface undulates in 2 dimensions (e.g., exhibits a knurling pattern). In a third specific example, as shown in FIG. 16, the substrate 122 has a honeycomb surface arrangement (e.g., a closely packed pattern of tubular or polygonal cavities) and can be fashioned into any suitable-macro geometry (e.g., a cylinder, a cube, a sinuous layered stack, etc.). However, the substrate 122 can have any other suitable geometry.

In variations, the substrate 122 includes a textile material (e.g., felt, wool-fiber-based, synthetic-fiber-based, blended natural and synthetic fibers, woven, non-woven, etc.). However, the substrate 122 can additionally or alternatively include any other suitable fibrous material, and/or solid material upon which photocatalytic material can be disposed (e.g., semiconductor material, insulator material, metallic foils, non-metallic foils, etc.). In variations, the fibrous material of the substrate 122 can be made up of substantially opaque fibers (e.g., opaque to visible and near-visible light frequencies) but can additionally or alternatively be made up of non-opaque fibers (e.g., transparent, translucent, etc.). In further alternative variations, the fibrous material can include optical fibers configured to transport photons along the longitudinal axes of the fibers (e.g., via total internal reflection); in a specific example of such variations, the optical fibers are coated in a photocatalytic cladding and/or photocatalytic nanostructures and are configured to leak a fraction of the transported photons to or through the cladding and thereby activate the photocatalytic properties of the coating (e.g., for air purification). In another variation, the substrate 122 includes a metallic surface (e.g., a foil, a plate, a wafer, etc.) on which nanostructures can be directly grown (e.g., via chemical vapor deposition, electro-deposition, etc.). However, the substrate 122 can additionally or alternatively include any other suitable material that can act as a medium upon which the photocatalytic material 124 can be disposed.

The filter assembly 120 can optionally include a support structure (e.g., external wire mesh, internal wire mesh, integrated pliable fibers, etc.) that functions to mechanically support the substrate 122 and can also function to give the substrate 122 a defined shape. In variations, the support structure can function to enhance the electron or hole mobility of electrons or holes generated within and/or upon the substrate (e.g., by being arranged adjacent to the substrate). In variations wherein the substrate 122 is made of a textile material that is substantially flexible, the support structure can provide rigidity thereto. The shape of the support structure preferably defines the shape of the substrate 122 as discussed above; however, the support structure can additionally or alternatively have any suitable shape (e.g., in cases wherein the textile material can permanently or semi-permanently define a rigid shape without requiring an additional rigid support structure).

Figure 13:
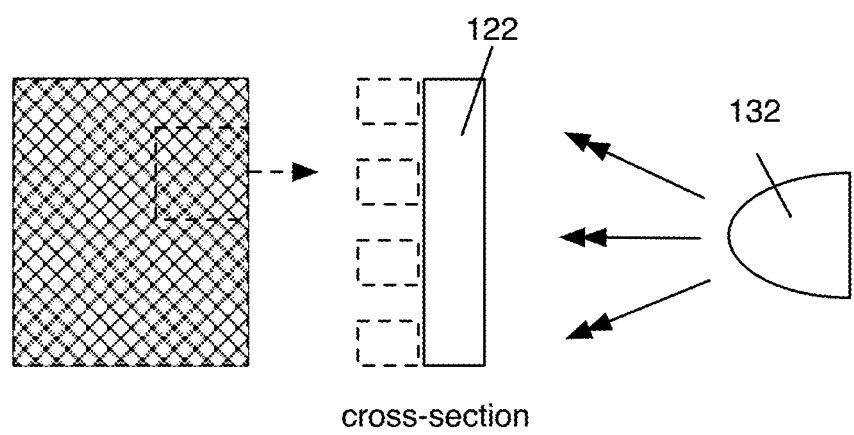
FIG. 13 depicts an example relative arrangement of a substrate, support structure, and photon source of a variation of the air purification system.

In a specific example, as shown in FIG. 14, the substrate 122 is pleated along an azimuthal direction about the longitudinal axis to form a set of pleats and includes a support structure made up of a metallic mesh layer arranged at a first side of the substrate 122 opposing the direction of illumination (e.g., as shown in FIG. 13). In this example, the metallic mesh provides structural rigidity to the set of pleats.

The support structure is preferably made up of a low-outgassing material. The low-outgassing material can include, in variations, a baked aluminum alloy, a polymer having a high vapor pressure, a metallic or non-metallic material free of solvents or chemicals that may substantially outgas, and any other suitable material. However, the support structure can additionally or alternatively be made of any other suitable material.

In some variations, the substrate 122 defines an internal rigidity that functions to provide the micro- and macro-geometric shape of the substrate (e.g., without an additional support structure). In examples of such variations, the substrate 122 can be made of a foil (e.g., that can be fashioned into any suitable three-dimensional shape), a solid material (e.g., that can be additively or subtractively manufactured into any suitable three-dimensional shape), ductile or semi-rigid metallic fibers (e.g., in whole or in part), and/or any other suitable material.

In a first example, the support structure includes a wire mesh, and is arranged in a cylindrical tubular form factor as shown in FIG. 7A. In a second example, the support structure defines a corrugated surface as shown in FIG. 7B. However, the support structure can be otherwise suitably shaped, arranged and/or configured.

The photocatalytic material 124 functions to provide a catalytic site for destruction of pollutants proximal the surface of the filter assembly 120. The photocatalytic material 124 can also function to generate an electron-hole pair upon illumination by a photon, which preferably generates a hydroxyl radical upon interacting with water vapor contained in the surrounding air. The hydroxyl radical thus generated preferably contributes to chemical elimination (e.g., oxidation) of pollutants. However, the pollutants can be otherwise suitably reduced and/or destroyed (e.g., via direct photoionization, secondary photoionization, direct reaction with a free electron and/or hole, etc.).

The photocatalytic material 124 is formed at least partially of nanostructures, and the nanostructures are preferably formed at least partially from one or more photocatalysts (e.g., zinc oxide, tin dioxide, tungsten oxide, zirconium dioxide, titanium dioxide in anatase, rutile, and/or any other suitable phase; sodium tantalate; various semiconductors, doped titanium dioxide; a combination of photocatalytic materials doped or undoped; any other suitably photocatalyst; etc.), but can additionally or alternatively be formed from any other suitable material (e.g., carbon, carbon-containing compounds, rare earth metals, precious metals, any metallic element or compound, etc.). The nanostructures can include a combination of nanotubes and nanoparticles (e.g., spherical nanoparticles, substantially spherical nanoparticles, nanobeads, globular nanoparticles, etc.). However, the nanostructures can additionally or alternatively include nanotubes, nano-rods, nano-wires, hollow nanotubes, a homogenous or heterogeneous material made up of any of the aforementioned nanostructures and/or any other suitable nanostructures or combinations thereof.

The photocatalytic material 124 is preferably coupled to the substrate 122. In a first variation, the photocatalytic material 124 is secured to the fibers of a fibrous substrate 122 (e.g., by way of an adhesive, electrostatic attachment, covalent linking, ionic bonding, static friction, etc.). In a second variation, the photocatalytic material 124 is deposited directly onto the surface of the substrate 122 (e.g., grown on the substrate 122 directly through chemical vapor deposition, ion deposition, etc.; painted onto the substrate 122 as a component of a solution, suspension, or mixture, etc.; otherwise suitably attached; etc.). The photocatalytic material 124 can be secured to a layer of the substrate 122 (e.g., a surface layer), multiple layers of the substrate 122 (e.g., a top and bottom layer), bodily attached to the substrate 122 (e.g., substantially homogenously through the volume of the substrate 122), or otherwise suitably secured. Additionally or alternatively, the photocatalytic material 124 can be otherwise suitably attached to the substrate 122 in any suitable manner.

The photocatalytic material 124 can include any suitable photocatalytic nanostructures, combined in any suitable ratio and/or combination. In variations wherein the photocatalytic material 124 includes multiple types of nanostructures, the photocatalytic material 124 can be a homogeneous mix of the multiple types of nanostructures, a patterned combination (e.g., wherein a first set of regions of the photocatalytic material 124 disposed on the substrate 122 include substantially solely a first type or types of nanostructure, and a second set of regions include substantially solely a second type or types of nanostructure), or any other suitable combination. In a specific example, the photocatalytic material 124 includes nanostructures substantially as described in U.S. application Ser. No. 16/161,600, filed 16 Oct. 2018, which is incorporated in its entirety herein by this reference. However, the photocatalytic material 124 can be otherwise suitably constituted.

The filter assembly 120 can optionally include a prefilter 125. The prefilter 125 functions to remove macroscopic contaminants from the airflow prior to interaction of the airflow with the photocatalytic material 124 of the filter assembly 120. The prefilter 125 is preferably arranged between the inlet in and the substrate of the filter assembly 120 within the lumen 114. The prefilter 125 can be integrated into the filter assembly (e.g., as a layer of or in addition to the substrate) but can additionally or alternatively be a separate component (e.g., a self-contained prefilter distinct from and arranged distal to the filter assembly along the flow path). However, the prefilter 125 can be otherwise suitably arranged at any other suitable location within or in relation to the system.

The prefilter 125 can be retained separately from the other portions of the filter assembly 120 by a portion of the housing 110 (e.g., a prefilter 125 tray of the housing no), but can be otherwise suitably retained. In alternative variations, the system can omit a prefilter 125.

3.3 Photon Source

The system preferably includes a photon source 130. The photon source 130 functions to illuminate the photocatalytic material 124, and thereby generate electron-hole pairs (e.g., that can subsequently react with water vapor to form hydroxyl radicals). The photon source 130 also functions to generate photons at a specified photon energy or range of photon energies. Preferably, the photon energies correspond to portions of the electromagnetic spectrum having a longer wavelength (i.e., lower energy) than UV-B or UV-C to avoid direct photoionization of airborne compounds; alternatively, the photon energies can correspond to portions of the electromagnetic spectrum having shorter wavelengths (e.g., corresponding to UV-B or UV-C wavelength ranges). In particular, the wavelength range output by the photon source can, in a first example, define a minimum wavelength that is longer than at least 280 nanometers (e.g., including no UV-C light); and, in a second example, longer than at least 315 nm (e.g., including no UV-B light); and, in a third example, longer than at least 320 nm (e.g., including only a portion of the spectrum corresponding to UV-B at the shortest wavelength); and, in a fourth example, longer than at least 400 nm (e.g., including only visible light at the shortest wavelength). In further examples, the photon energies can correspond to at least a band gap energy of the photocatalytic material 124, such that absorption of a photon promotes an electron in the valence band of the photocatalytic material 124 to the conduction band. In further examples, the photon energies can correspond to an integer fraction or multiple of the band gap energy of a photocatalyst of the photocatalytic material 124. However, the photons generated by the photon source 130 can additionally or alternatively have any suitable energy and/or range of energies.

The photon source 130 preferably includes a plurality of light emitters 132 (e.g., light emitting diodes/LEDs, fluorescent tubes, incandescent emitters, multiplexed optical fibers, etc.) arranged in an emitter array, but can additionally or alternatively include any suitable number of light emitters 132 (e.g., a single LED, a single UVA compact fluorescent bulb, etc.) arranged in any other suitable manner. In variations, the array defines a set of columns and a set of rows in three-dimensional space, and in a specific example each of the set of columns is equally spaced in an azimuthal direction perpendicular to the longitudinal axis and each of the set of rows is equally spaced in a vertical direction parallel to the longitudinal axis. In other examples, the set of columns and the set of rows can be asymmetrically spaced about their respective axes (e.g., to achieve a desired asymmetric irradiance distribution at the surface of the substrate).

In a further variation, the system does not include an integrated photon source 130 and is illuminated by an external source (e.g., sunlight) directed (e.g., via reflectors, optical fibers, etc.) to illuminate the filter assembly 120.

The photon source 130 is preferably connected to a power source (e.g., building power, wall power, electric grid power, battery, etc.) that functions to power the photon source 130. The photon source 130 is arranged within the housing no such that the photons emitted therefrom illuminate the photocatalytic material 124 of the filter assembly 120. The photon source 130 is preferably offset from the filter assembly 120 by a specified distance, wherein the specified distance is selected to optimize the radiant intensity (e.g., from the photon source 130) at the point in space at which the filter assembly 120 is arranged (e.g., at the specified distance). Additionally or alternatively, the specified distance can be determined based on alternative considerations (e.g., manufacturability, structural limits, etc.) and the power supplied to the photon source can be determined in order to optimize the radiant intensity (e.g., given the specified distance determined from alternative considerations). However, the photon source 130 can additionally or alternatively be otherwise suitably arranged relative to the filter assembly 120.

In a first variation, the photon source 130 is arranged within a void defined by the filter assembly 120 (e.g., inserted within the filter assembly 120) and is thus circumscribed by the filter assembly 120. In a second variation, the photon source 130 is arranged externally to the filter assembly 120 (e.g., offset therefrom, circumscribing, at an oblique angle to, etc.). The photon source 130 is preferably operable between an on state and an off state, wherein in the on state the photon source 130 is powered and emitting photons, and wherein in the off state the photon source 130 is unpowered and not emitting photons. The photon source 130 can be operable at any state between the on state and the off state, wherein any number of photons between zero photons and the maximum number of photons are emitted. The photon source 130 is preferably operated between the on state and the off state by the controller 150 (e.g., in response to instructions generated by the controller 150), but can be otherwise suitable operated (e.g., via plugging in and/or unplugging the system from grid power).

The radiant intensity of the light output by the photon source 130 at the surface (e.g., the irradiance distribution at the surface) is preferably equivalent (e.g., substantially equivalent, within a measurable threshold power, etc.) to a threshold power per unit area (e.g., watts per square meter, milliwatts per square inch, etc.) at the majority of the illuminated surface of the filter assembly 120 (e.g., 100% of the surface, 90% of the surface, 50.1% of the surface, etc.). The threshold power per unit area can be any suitable threshold value (e.g., at least 50 W/m$^2$, at least 5 W/m$^2$, at least 60 W/m$^2$, at least a value between 0.1-100 W/m$^2$, and any other suitable value, etc.). In a specific example, the irradiance distribution defines an irradiance of at least 50 watts per square meter at each point of a side of the substrate 122 (e.g., a side opposite to any occluding layer such as a support structure of some variations of the filter assembly 120). Alternatively, the radiant intensity can be spatially modulated by the photon source 130 (e.g., via lensing, via arrangement of individual emitters, etc.) to produce any suitable spatial pattern of radiant intensity. In examples, the irradiance distribution produced by the photon source can be matched to a spatial distribution (e.g., achieved via patterned deposition or other suitable attachment) of the photocatalytic material 124 on the substrate 122 (e.g., as shown by example in FIG. 15). However, the photon source 130 can otherwise generate any suitable radiant intensity (e.g., 1 W/m$^2$, 25 W/m$^2$, 100 W/m$^2$, etc.) at the illuminated surface of the filter assembly 120.

Figure 11:
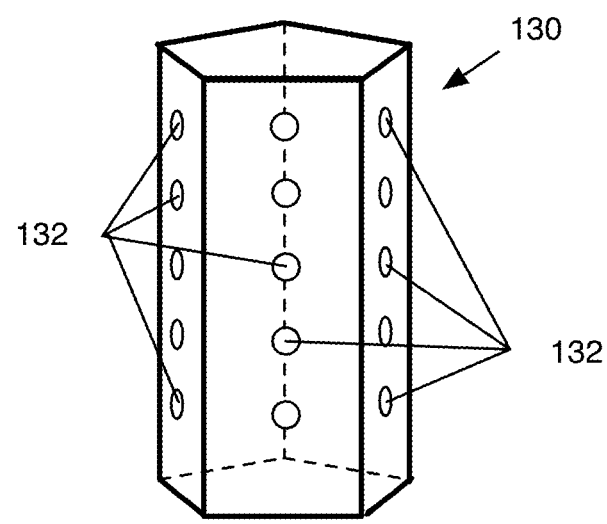
FIG. 11 is a schematic representation of a variant of the photon source.
Figure 12:
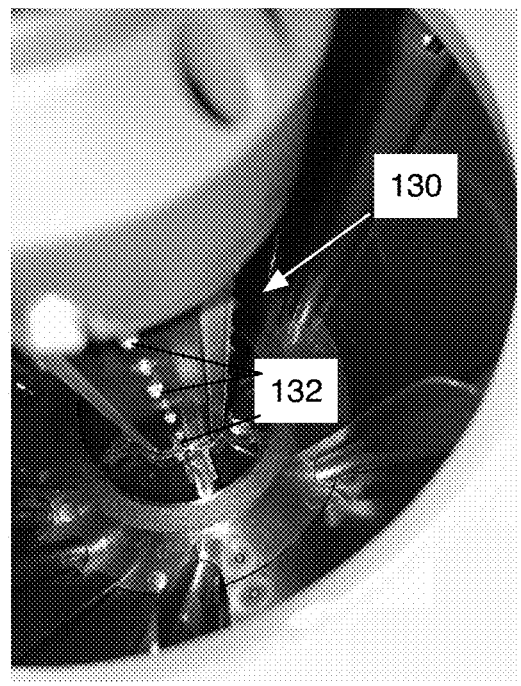
FIG. 12 is an example of the photon source.

In a first variation, the photon source 130 includes a plurality of light emitting diodes (LEDs) arranged in a three-dimensional array (e.g., a polygonal prismatic array, a cylindrical array, a tubular array, etc.). The array of LEDs 132 is arranged within the system concentrically relative to a tubular filter assembly 120 and illuminates the internal surface of the substrate 122 of the filter assembly 120 (and the photocatalytic material 124 disposed thereon). In a specific example of this variation, as shown in FIG. 11, the photon source 130 includes an array of 25 LEDs 132, including 5 vertical rows that include 5 LEDs 132 in each row, equally spaced azimuthally within each row and equally spaced vertically between each row. In another specific example, as shown in FIG. 12, the photon source 130 includes an array of 36 LEDs 132, including 6 vertical rows that include 6 LEDs 132 in each row, wherein the LEDs 132 in each row are not equally spaced azimuthally and the rows are not equally spaced in the vertical direction. However, the photon source 130 can additionally or alternatively include a plurality of LEDs 132 arranged in array of any suitable shape (e.g., right rectangular prismatic, tapered rectangular prismatic, right hexagonal prismatic, tapered hexagonal prismatic, right pentagonal prismatic, tapered pentagonal prismatic, cylindrical, tubular, conical, etc.).

Figure 15:
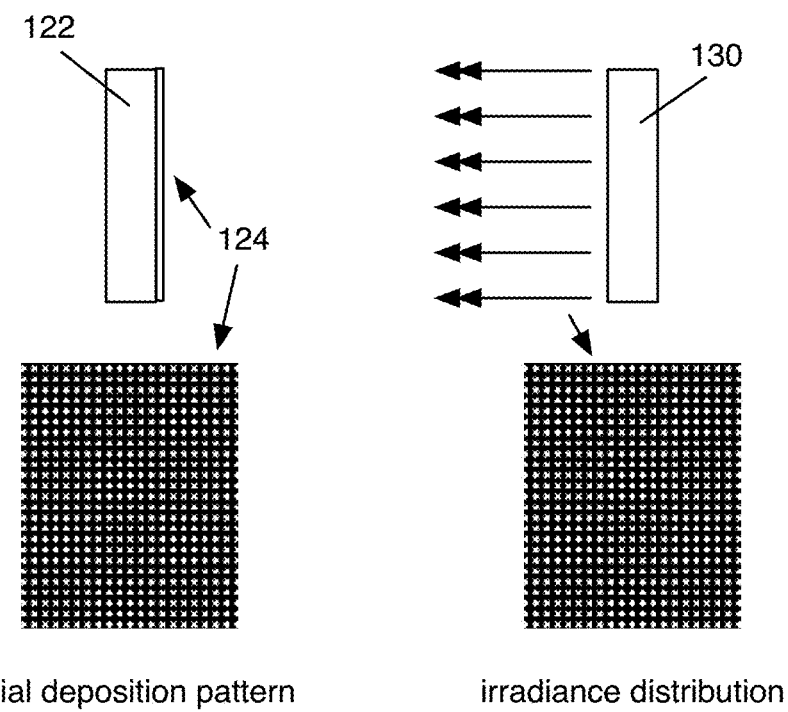
FIG. 15 depicts an example of matched spatial distributions of photocatalytic material and irradiance in accordance with a variation of the air purification system.

In a specific example, as shown in FIG. 15, the photocatalytic material 124 is disposed on the substrate 122 in a spatial deposition pattern, and the set of light emitters 132 is arranged to spatially modulate the irradiance distribution (e.g., at a threshold power level at intense portions of the distribution, and below the threshold power level or at a zero power level at non-intense portions of the distribution) in a matching spatial pattern.

In another variation, the photon source 130 includes a single light emitting element (e.g., a fluorescent tube) that is inserted within a tubular filter assembly 120 and illuminates the internal surface of the substrate 122 (and the photocatalytic material 124 disposed thereon). In a still further variation, the photon source 130 includes a plurality of light emitting elements disposed on the inner surface of the lumen 114, which illuminate the outer surface of the substrate 122 (and the photocatalytic material 124 disposed thereon). However, the photon source 130 can include any suitable number of light emitting elements otherwise suitably arranged (e.g., including having light emitting elements arranged both within a tubular filter assembly 120 and about the tubular filter assembly 120 such that both the internal surface and external surface of the substrate 122 are illuminated).

In a specific example, the photon source 130 is arranged along the longitudinal axis defined by the housing 110, and a first side of the substrate 122 is proximal an interior surface of the lumen 114 of the housing 110 and a second side of the substrate 122 is proximal the photon source 130 (e.g., to avoid occlusion of the substrate by a support structure adjacent to the first side of the substrate).

However, the photon source 130 can be otherwise configured and/or include any other suitable set of photon-emitting elements arranged in any suitable configuration.

3.4 Flow Control Mechanism

The system preferably includes a flow control mechanism 140. The flow control mechanism 140 functions to urge fluid flow through the device (e.g., within the lumen 114 between the inlet 111 and the outlet 112). The flow control mechanism 140 can also function to modulate flow variables of the fluid flowing through the device (e.g., temperature, humidity, density, pressure, energy, etc.). The flow control mechanism 140 is preferably mounted to the housing no but can alternatively be coupled to the housing no from an adjacent location (e.g., as a modular attachment via a hose, tube, duct, etc.). The flow control mechanism 140 is preferably arranged proximal to at least one of the inlet 111 and the outlet 112 of the housing 110.

In one variation, the flow control mechanism 140 includes an impeller 142 arranged within the housing 110, downstream of the inlet 111 and upstream of the filter assembly 120. In another variation, the impeller is positioned downstream of the filter assembly 120. In another variation, the impeller is arranged between a prefilter 125 and the filter assembly 120 along the flow path. In another variation, the impeller is arranged upstream of both a prefilter 125 and the filter assembly 120 along the flow path. However, the impeller can be otherwise suitably arranged. In related variations, the flow control mechanism 140 can include any other suitable active flow promoter, such as a jet, a propeller, a rotor, a thermal pump, a reciprocating pump, or any other suitable mechanism for urging flow between the inlet 111 and the outlet 112.

The flow control mechanism 140 is preferably arranged at a single location along the flow path through the housing 110 but can additionally or alternatively include distinct modules arranged at multiple locations along the flow path and/or adjacent to the flow path. For example, the flow control mechanism 140 can include humidity control modules distributed at plurality of locations along flow path through the housing 110, as well as plurality of pumps (e.g., impellers) positioned along the flow path (e.g., proximal to the inlet in and proximal to the outlet 112). However, the flow control mechanism 140 can be otherwise suitable arranged or positioned.

The flow control mechanism 140 can include one or more passive flow guides. The passive flow guides function to direct airflow within the lumen 114, proximal the filter assembly 120. For example, the passive flow guides can include a set of vanes, one or more stator blades, or any other suitable structures for directing airflow. The passive flow guides are preferably defined by a portion of the interior surface of the housing 110, but can additionally or alternatively include distinct components, and/or be defined by portions of the flow control mechanism 140 (e.g., a fan cover including flow-directing slats). In a specific example, the flow control mechanism 140 includes a three-dimensional array of vanes positioned adjacent to the outlet 112 on the downstream side thereof and are configured to generate a swirling flow action (e.g., large scale vorticity) in the outlet 112 air flow. In another specific example, the passive flow guide includes one or more surfaces (e.g., helical vanes, corkscrew surfaces, auger surfaces, etc.) arranged to induce a helical flow path within the lumen 114. In another example, the passive flow guide includes a feature extending into the flow path along a transverse direction to the flow path, wherein the feature is configured to turbulate air flow downstream of the feature along the flow path (e.g., as a bluff body in the free stream of the flow). However, the passive flow guide(s) can be otherwise suitably configured and/or arranged.

In specific examples, the flow control mechanism can include components for agitating fibers (e.g., upon which photocatalytic nanoparticles are disposed) analogously to those described in U.S. application Ser. No. 14/801,026, filed 16 Jul. 2015, which is incorporated herein in its entirety by this reference.

3.5 Controller

The system can include a controller 150. The controller 150 functions to control the operation of the photon source 130 between operating modes (e.g., an on mode, an off mode, a high-power mode, a low power mode, etc.). The controller 150 can also function to control the operation of the flow control mechanism 140 between operating modes (e.g., an on mode, an off mode, a high-speed mode, a low-speed mode, etc.). The controller 150 is preferably communicatively coupled to the flow control mechanism 140 and the photon source 130 (e.g., via direct electrical connection, wireless data connection, a combination of data and power connections, etc.), but can additionally or alternatively be otherwise suitably coupled to any other system components.

Figure 8:
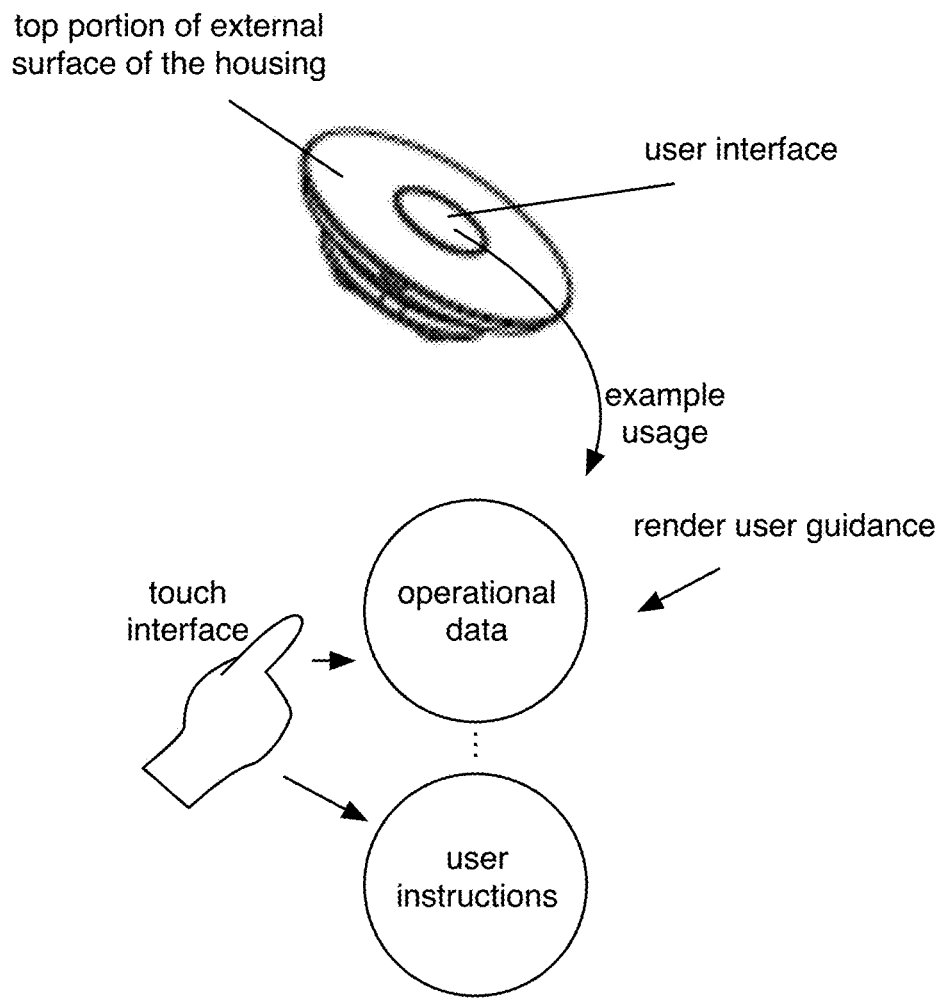
FIG. 8 depicts an illustration of a variation of a user interface of an example embodiment of the air purification system.

The controller 150 can optionally include a user interface that functions to enable a user to interact with the system and provide user inputs to the controller 150 for the creation of control inputs to various system components. In a specific example, the user interface can include a touch screen arranged at a top portion of the external surface of the housing no, as shown by example in FIG. 8. However, the user interface can include any other suitable interface inputs (e.g., buttons, switches, latches, keypads, microphones, wireless radios, etc.) and/or outputs (e.g., lights, speakers, wireless radios, screens, etc.).

The system can include one or more sensors communicatively coupled to the controller 150. The sensors function to detect parameters of system operation and provide signal outputs based on the detected parameters (e.g., a flow characterization metric, a performance characterization metric, an illumination characterization metric, etc.). The system can include one or more pressure sensors, particulate sensors, pollutant (e.g., chemical) sensors, temperature sensors, humidity sensors, VOC sensors, dust sensors, optical sensors, illumination-level sensors, mechanical sensors (e.g., contact switches, pressure switches, etc.), and any other suitable type of sensors. The sensors can be integrated with the system (e.g., built into the housing and integrated therewith), removably coupled to the system (e.g., clipped to the outlet of the housing, placed upon surfaces of the housing, etc.), arranged proximal other portions of the system as a separate component (e.g., as an in-home air quality monitor in wireless communication with the controller), and/or otherwise suitably arranged (e.g., remotely arranged and communicatively coupled to the controller by way of a remote server and data connection). The controller 150 can, in variations, operate components between operating modes based on the sensor outputs (e.g., received by the controller 150 via communicative coupling such as a direct data connection, analog signal, digital signal, wireless signal, wired signal, etc.). For example, the system can include a pollutant sensor proximal the outlet 112 of the housing 110 (e.g., a diode laser gas sensor, a particulate sensor, etc.), and the controller 150 can operate the photon source 130 according to the output of the pollutant sensor (e.g., turning the photon source 130 into an on state based on detected pollutants). In another example, the system can include one or more pairs of pressure sensors across one or more elements disposed within the flow path (e.g., the filter assembly 120, the flow control mechanism 140, the prefilter 125, etc.) to measure the differential pressure drop across such elements; in response to the differential pressure drop exceeding a threshold pressure drop, the controller 150 can generate an alert (e.g., a notification that the prefilter 125 should be replaced due to excessive pressure drop).

In variations, the controller 150 is communicatively coupled to a sensor and the impeller 142 of the flow control mechanism 140 (e.g., to receive a flow characterization metric from the sensor and control the impeller) and can actively modulate the flow based on the sensor output. In examples, the controller 150 is operable to modulate a flow rate through the impeller based on the flow characterization metric. For example, the flow characterization metric can include a pressure drop value across one or more portions of the flow path (e.g., across the prefilter, across the lumen of the housing, between the inlet and outlet, etc.), and the controller 150 can modulate the power delivered to the impeller to maintain the pressure drop in a desired range. In another example, the flow characterization metric can include a pollutant concentration value, and the controller 150 can modulate the power delivered to the impeller to reduce a flow rate in response to a low pollutant concentration (e.g., below a threshold) to increase filter lifetime (e.g., to prevent high-throughput filtration of substantially purified air) and/or for any other suitable purpose. In another example, the flow characterization metric can include a humidity value, and the controller 150 can modulate the power delivered to the impeller to increase a flow rate in response to a low humidity level (e.g., to increase the throughput of water vapor that can form oxidizing radicals upon photocatalytic breakdown). However, the controller 150 can additionally or alternatively control the flow control mechanism and/or portions thereof in any suitable manner based on a flow characterization metric and/or any other suitable sensor output (e.g., processed sensor output, raw sensor output, etc.).

In variations, the controller 150 is communicatively coupled to a sensor and the photon source (e.g., to receive a performance characterization metric from the sensor and control the photon source) and can actively modulate the irradiance distribution based on the sensor output. Active modulation can include temporal modulation (e.g., modulating output irradiance, turning the photon source on and off, etc.) and/or spatial modulation (e.g., redirecting the light emitters and/or the output thereof, such as via actuatable optics; turning a subset of light emitters of an array on or off to generate different irradiance distributions at the illuminated surface; etc.). In a specific example, the performance characterization metric can include a pollutant concentration value, and the controller can reduce the power delivered to the photon source (e.g., and the radiant intensity of the optical radiation output by the photon source) in response to the pollutant concentration falling below a threshold value (e.g., to increase system lifetime by reducing the power expended in purifying substantially-purified air). However, the controller 150 can additionally or alternatively modulate the photon source in any suitable manner based on any suitable sensor output.

The controller 150 can additionally or alternatively operate the system between various operating modes, including a continuous mode, a closed loop mode, and a user-controlled mode. In the continuous operating mode, the system is operating continuously to process and purify air. In the closed loop operating mode, the controller 150 operates the system between an on state and an off state, wherein in the on state the system is actively purifying air and promoting air flow through the device and in the off state the system is dormant, based on sensor inputs (e.g., flow characterization metrics, performance characterization metrics, etc.). In the user-controlled operating mode, the system is operated according to user instructions received by the controller 150. User instructions can include an operation schedule (e.g., a range of times during which the system is to be operated in the on or off states), an operation condition (e.g., a pollutant level and/or air quality metric threshold at which the system is to be activated and operated in the on state), and/or any other suitable user instructions.

3.6 Additional Specific System Examples

In a specific example, the air purification system 100 includes a housing 110 defining a lumen 114, an inlet 111 in fluid communication with the lumen 114 and defining a first opening proximal a first end of the housing 110, an outlet 112 in fluid communication with the lumen 114 and defining a second opening proximal a second end of the housing 110, and a flow pathway between the inlet 111 and the outlet 112 and through the lumen 114. This example also includes a filter assembly 120 retained within the lumen 114 of the housing 110 and including a substrate 122 defining an open three-dimensional volume arranged concentrically within the housing 110, and a photocatalytic material 124 disposed on the substrate 122. In this example, the substrate 122 is at least partially permeable to air flow, at least a portion of the flow pathway intersects the open three-dimensional volume. This example also includes a photon source 130 concentrically arranged relative to the housing 110 and arranged to illuminate the photocatalytic material 124 with optical radiation. This example also includes a flow control mechanism 140 including an impeller module 142 coupled to the housing 110 and arranged along the flow pathway upstream of the filter assembly 120 between the inlet 111 and the outlet 112, and a passive flow guide arranged between the impeller module 142 and the filter assembly 120 along the flow path.

In a related example, the housing 110 defines a cylinder defining a top and bottom, and the open three-dimensional volume is an open cylindrical volume defining a longitudinal axis between an open top and an open bottom (e.g., within the vertical range defined between the top and bottom of the cylinder of the housing).

In another specific example, the air purification system includes a housing 110 defining a lumen 114 (e.g., wherein the lumen 114 defines a longitudinal axis). This example also includes a filter assembly 120 retained within the lumen 114, and the filter assembly 120 includes a substrate 122 defining an open three-dimensional volume (e.g., arranged concentrically about the longitudinal axis of the lumen), a photocatalytic material 124 disposed on the substrate 122, and a support structure adjacent to the substrate 122 at a first side. In this example, the support structure is optically opaque. This example also includes a photon source 130 (e.g., arranged concentrically about the longitudinal axis) including a set of light emitters 132 arranged in a polygonal prismatic array defining a set of columns and a set of rows. In this example, the photon source 130 defines an irradiance distribution of optical radiation at a second side of the substrate 122 opposing the first side (e.g., during operation of the system wherein the photon source receives power and illuminates the substrate; during operation of the system wherein the photon source is external to the system, provided by an ambient source such as sunlight; etc.), and the optical radiation defines a wavelength range that includes a wavelength between 320 nanometers (nm) and 700 nm (e.g., corresponding to the near-UV to visible range). In related examples, the optical radiation can define a wavelength range that includes a wavelength between any other suitable wavelengths (e.g., 280-700 nm, 315-700 nm, 400-700 nm, 280-1000 nm, etc.). This example also includes a flow control mechanism 140 coupled to the housing 110 that urges airflow (e.g., via an active propulsion devices such as an impeller) along a flow pathway within the lumen 114 and proximal the filter assembly 120.

4. Method

The method 200 for air purification preferably includes: providing a flow path having a flow control mechanism, a filter assembly, and a photon source disposed thereon S210; urging a flow of air along the flow path using the flow control mechanism S220; illuminating the filter assembly using the photon source S230; and ejecting the flow of air from the flow path using the flow control mechanism S240. The method for air purification can optionally include: modulating the flow of air S225; modulating the illumination S235; and/or any other suitable method process or Blocks.

The method 200 is preferably implemented at least in part by an embodiment of the system described above in Section 3. However, the method 200 can be otherwise suitably performed by any suitable air purification system.

Block S210 functions to provide a system for purifying and/or decontaminating an airflow. The system is preferably substantially identical to the system 100 described in Section 3 above; however, the system can additionally or alternatively be any suitable system for air purification utilizing photocatalytic oxidation of pollutants.

Block S220 functions to direct airflow (e.g., containing pollutants) into contact with the filter assembly so that pollutants within the airflow can be destroyed. Block S220 can also function to enhance the volumetric mixing of the airflow (e.g., by forming turbulence in the flow) and thereby increase the likelihood that pollutants will be reduced within the residency duration of the pollutants proximal the filter assembly (e.g., within the lumen).

In a first variation, Block S220 includes modulating the volumetric flow rate of air flow through the system. Modulating the volumetric flow rate can be performed by increasing and/or decreasing power delivery to a flow control mechanism of the system (e.g., by increasing and/or decreasing the RPM of an impeller of the system), increasing and/or decreasing the effective area of a cross section of the flow path through the system (e.g., opening or closing a throttle valve), and/or in any other suitable manner. Modulating the volumetric flow rate can be performed based on measured performance parameters. For example, the flow rate can be increased and/or based on a measured pollutant concentration in the outflow falling below and/or above a threshold level.

Figure 10:
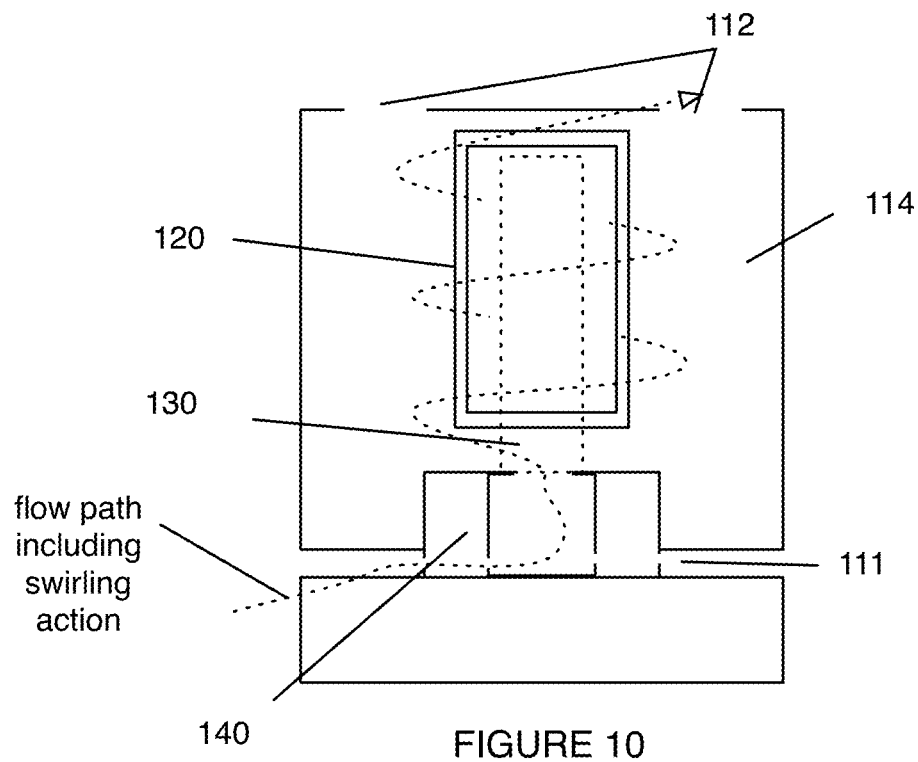

In a second variation, as shown in FIG. 10, Block S220 includes injecting a swirling action into the airflow downstream of a flow control mechanism of the system. A swirling action can be injected by way of passive means (e.g., static guide vanes), active means (e.g., actively adjustable guide vanes, an absence of guide vanes in conjunction with a rotating fan blade, etc.) and/or by any other suitable flow guiding mechanism. Injecting a swirling action functions to increase the average residence time of fluid elements of the fluid flow within the volume of the system, and thereby increase the pollutant removal efficiency associated with a single passage of each fluid element through the air purification system. Injection a swirling action can also function to increase the fraction of the fluid flow that contacts the surface of a filter assembly of the system (e.g., by increasing the transport coefficient of particles and molecules in the fluid flow, such as pollutants). Injecting a swirling flow can also function to increase the likelihood that fluid elements pass between a photon source and a filter assembly of the system, during passage between the inlet and the outlet. However, in alternative variations, Block S220 can include urging a straight airflow pattern, as shown in FIG. 9, downstream of the flow control mechanism or otherwise controlling the direction(s) of the flow through the system in any suitable manner.

Block S220 can include Block S225, which includes modulating the flow of air. Block S225 functions to actively adjust the air flow and/or properties thereof (e.g., flowrate, flow temperature, humidity of the flow, etc.) to affect system performance. Block S225 can include modulating (e.g., increasing and/or decreasing, turning on and off, etc.) the flow rate based on sensor outputs (e.g., flow characterization metrics, performance characterization metrics, etc.); for example, Block S225 can include turning off the impeller (e.g., to stop active promotion of airflow through the device) based on an external sensor detecting a pollutant concentration in the ambient environment that is below a threshold level (e.g., a level below which system efficiency is undesirably low, a level below which human health is substantially unaffected, etc.).

Block S230 functions to instantiate an illumination profile (e.g., irradiance distribution) of the photon source upon the filter assembly, to activate the photocatalytic material (e.g., generate electron-hole pairs). Block S230 can include providing power to the photon source (e.g., wherein the photon source is an electrically powered photon source). Block S230 can also include arranging the substrate to receive optical radiation (e.g., in cases wherein the photon source is external and is not actively controllable, such as wherein the photon source is sunlight). The substrate can be actively arranged (e.g., via a controllable actuator) or passively arranged (e.g., manually via positioning of the substrate by hand).

Block S230 can include Block S235, which includes modulating the illumination (e.g., spatially modulating, temporally modulating, etc.). Block S235 can function to optimize power utilization of the system by modulating the photon source (e.g., operating the photon source between the on and off state; increasing or decreasing the irradiance provided by the power source; etc.) based on sensor outputs (e.g., flow characterization metrics, performance metrics, etc.). For example, Block S235 can include transitioning the photon source between an on state and an off state based on pollutant concentration in the airflow (e.g., turning off the photon source upon pollutant concentration falling below a threshold level). In another example, Block S235 can include pulsing the photon source to achieve higher peak irradiance at the same or lower average power levels. However, Block S235 can additionally or alternatively include modulating the photon source in any suitable manner based on any suitable sensor outputs or with any other suitable basis (e.g., a schedule, a time of day such as day time or night time, an ambient light level, etc.).

Blocks S220 and S230 and/or variations or portions thereof are preferably performed in conjunction, such that the airflow is directed and the illumination profile (e.g., irradiance distribution) provided or altered in concert to affect (e.g., maximize, optimize, etc.) air purification performance. In a first variation, the intensity of the illumination varies based on (e.g., is increased linearly with, is increased exponentially with, is increased logarithmically with, etc.) volumetric flowrate. In a second variation, the spatial modulation of the illumination profile is adjusted to match regions of reduced bulk fluid flow (e.g., due to turbulent mixing, stationary or nearly stationary eddies, stagnation regions, etc.) such that volumetric regions of the fluid flow having higher relative mixing are proximal to filter regions receiving relatively higher intensity illumination (e.g., as compared to other illuminated or non-illuminated regions of the interior volume). However, the illumination profile can be otherwise suitably adjusted based on directing the airflow and/or other system operating parameters, and the airflow can be otherwise suitably controlled based on modulation of the illumination profile, in any other suitable manner. In further alternatives, Block S220 and S230 can be performed independently.

Block S240 can function to return the decontaminated airflow to the environment from which the airflow was gathered (e.g., input into the system via the inlet). Block S240 can also function to encourage mixing of the expelled airflow within the environment (e.g., room, vehicle, etc.) to increase the rate at which pollutants in the environment are processed by the system (e.g., versus diffusion processes alone). Block S240 can also function to transport purified fluid into a first region subsequent to intaking fluid from a second region that is separated from the first region (e.g., not in fluid communication with the first region).

In a similar manner to Block S220, Block S220 can include injecting a swirling action into the airflow downstream of an outlet of the system. A swirling action can be injected by way of passive means (e.g., static guide vanes), active means (e.g., actively adjustable guide vanes, active retraction of guide vanes to retain existing swirling flow action, etc.) and/or by any other suitable flow guiding mechanism. Injecting a swirling action downstream of the outlet functions to encourage distribution of purified air within the environment proximal to the system (e.g., in the same room, in the same dwelling, etc.). However, in alternative variations, Block S220 can include urging a straight airflow pattern downstream of the outlet or otherwise controlling the direction(s) of the flow out of the system in any suitable manner.

It should be noted that where coordinate systems and terminology related to relative orientation(s) are used herein, such terminology shall not be construed as referenced to global coordinates and/or orientations except where appropriate and/or explicit. For example, a system component having a "top" and/or "bottom" shall not be construed as having a particular orientation in relation to a gravity vector except as appropriate and/or explicit. Similarly, "vertical" and/or "horizontal" directions in relation to system components shall not be construed as having a particular orientation in relation to a gravity vector except as appropriate and/or explicit.

Embodiments of the system and method and variations thereof can be embodied and/or implemented at least in part by a machine configured to receive a computer-readable medium storing computer-readable instructions. The instructions are preferably executed by computer-executable components preferably integrated with the system and one or more portions of the processor and/or the controller, and additionally or alternatively physically separated therefrom and communicatively coupled thereto. The computer-readable medium can be stored on any suitable computer-readable media such as RAMs, ROMs, flash memory, EEPROMs, optical devices (CD or DVD), hard drives, floppy drives, or any suitable device. The computer-readable media can be integrated with, nearby to, or remotely accessible by the system and/or computer-executable components thereof. The computer-executable component is preferably a general or application specific processor, but any suitable dedicated hardware or hardware/firmware combination device can alternatively or additionally execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. An air purification system comprising:
   a housing defining:
      a lumen,
      an inlet in fluid communication with the lumen and comprising a first opening proximal a first end of the housing,
      an outlet in fluid communication with the lumen and comprising a second opening proximal a second end of the housing, and
      a flow pathway between the inlet and the outlet and through the lumen;
   a filter assembly retained within the lumen of the housing and comprising:
      a substrate defining an open three-dimensional volume arranged concentrically within the housing, wherein the substrate is at least partially permeable to air flow, and wherein at least a portion of the flow pathway intersects the open three-dimensional volume and passes through the substrate, and
      a photocatalytic material disposed on the substrate in a nonuniform spatial pattern;
   a photon source concentrically arranged relative to the housing and arranged to illuminate the photocatalytic material with optical radiation, wherein the photon source comprises a set of light emitters, wherein the photon source defines an irradiance distribution of optical radiation, wherein the set of light emitters is arranged to spatially modulate the irradiance distribution in a spatial pattern matching the nonuniform spatial distribution; and
   a flow control mechanism comprising:
      an impeller module coupled to the housing and arranged along the flow pathway upstream of the filter assembly between the inlet and the outlet, and
      a passive flow guide arranged between the impeller module and the filter assembly along the flow path.

2. The system of claim 1, wherein the housing defines a cylinder, wherein the first end comprises a top of the cylinder, wherein the second end defines a bottom of the cylinder, and wherein the open three-dimensional volume comprises an open cylindrical volume defining a longitudinal axis between an open top and an open bottom.

3. The system of claim 2, wherein the substrate is pleated along an azimuthal direction about the longitudinal axis to form a set of pleats, and wherein the filter assembly comprises a pleated metallic mesh layer arranged adjacent to a first side of the substrate, wherein the pleated metallic mesh layer provides structural rigidity to the set of pleats of the substrate.

4. The system of claim 2, wherein the lumen defines an inner surface having a monotonically increasing diameter extending along a longitudinal axis between the inlet and the outlet.

5. The system of claim 1, wherein the outlet comprises a set of outlet vanes, wherein each of the set of outlet vanes is arranged at an oblique angle to the flow path.

6. The system of claim 5, wherein the oblique angle at which each of the set of outlet vanes is arranged is identical.

7. The system of claim 1, wherein the passive flow guide comprises a surface arranged to induce a helical flow path within the lumen.

8. The system of claim 1, wherein the passive flow guide comprises a feature extending into the flow path along a transverse direction to the flow path, wherein the feature turbulates air flow downstream of the feature along the flow path.

9. The system of claim 1, further comprising a sensor arranged along the flow path that outputs a flow characterization metric during operation.

10. The system of claim 9, further comprising a controller communicatively coupled to the sensor and the impeller module, wherein the controller is operable to modulate a flow rate through the impeller module based on the flow characterization metric.

11. The system of claim 10, wherein the flow characterization metric comprises at least one of a pressure drop value, and a humidity value.

12. An air purification system comprising:
a housing defining a lumen, wherein the lumen defines a longitudinal axis;
a filter assembly retained within the lumen, wherein the filter assembly comprises:
  a substrate defining an open three-dimensional volume arranged concentrically about the longitudinal axis,
  a photocatalytic material disposed on the substrate in a nonuniform spatial pattern, and
  a support structure adjacent to the substrate at a first side, wherein the support structure is optically opaque, wherein the support structure is electrically conductive, wherein the support structure is in electrical contact with the substrate;
a photon source support arranged concentrically about the longitudinal axis, wherein the photon source support is arranged within the filter assembly, the photon source support comprising:
  a photon source comprising a set of light emitters arranged in a polygonal prismatic array defining a set of columns and a set of rows,
  wherein the photon source defines an irradiance distribution of optical radiation at a second side of the substrate opposing the first side during operation,
  wherein the set of light emitters is arranged to spatially modulate the irradiance distribution in a spatial pattern matching the nonuniform spatial pattern,
  wherein the optical radiation defines a wavelength range, and wherein a wavelength of the wavelength range is between 300 nanometers (nm) and 700 nm; and
an impeller module coupled to the housing and configured to urge airflow along a flow pathway within the lumen and proximal the filter assembly.

13. The system of claim 12, wherein each column of the set of columns is equally spaced in an azimuthal direction perpendicular to the longitudinal axis, and each row of the set of rows is equally spaced in a vertical direction parallel to the longitudinal axis.

14. The system of claim 12, wherein the photon source support is arranged along the longitudinal axis, and wherein the first side of the substrate is proximal an interior surface of the lumen of the housing and the second side of the substrate is proximal the photon source support.

15. The system of claim 12, further comprising a controller that is operable to temporally modulate the irradiance distribution of the photon source.

16. The system of claim 15, further comprising a sensor, communicatively coupled to the controller, that outputs a performance metric, wherein the controller is operable to temporally modulate the irradiance distribution between a first positive value and a second positive value based on the performance metric.

17. The system of claim 12, wherein the irradiance distribution defines an irradiance of at least 50 watts per square meter at each point of the second side of the substrate, and wherein the optical radiation generates photocatalytic activity at an irradiance of about 50 watts per square meter.

18. The system of claim 12, wherein a shortest wavelength of the wavelength range is longer than 320 nm.

19. The system of claim 18, wherein the shortest wavelength of the wavelength range is longer than 399 nm.

* * * * *